United States Patent
Kitagawa

(10) Patent No.: US 12,195,009 B2
(45) Date of Patent: Jan. 14, 2025

(54) APPARATUS AND METHOD FOR DISPLAYING LANE INFORMATION AND NON-TRANSITORY COMPUTER-READABLE MEDIUM CONTAINING COMPUTER PROGRAM FOR DISPLAYING LANE INFORMATION

(71) Applicant: TOYOTA JIDOSHA KABUSHIKI KAISHA, Toyota (JP)

(72) Inventor: Eiki Kitagawa, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/656,572

(22) Filed: Mar. 25, 2022

(65) Prior Publication Data

US 2022/0306126 A1 Sep. 29, 2022

(30) Foreign Application Priority Data

Mar. 25, 2021 (JP) ................. 2021-052130

(51) Int. Cl.
*B60W 40/09* (2012.01)
*B60W 50/14* (2020.01)

(52) U.S. Cl.
CPC ............ *B60W 40/09* (2013.01); *B60W 50/14* (2013.01); *B60W 2050/146* (2013.01); *B60W 2554/4041* (2020.02); *B60W 2554/4045* (2020.02)

(58) Field of Classification Search
CPC ................. B60W 40/09; B60W 50/14; B60W 2050/146; B60W 2554/4041;
(Continued)

(56) References Cited

U.S. PATENT DOCUMENTS 10,589,752 B2 * 3/2020 Mimura ................. B60K 35/00
2017/0334460 A1 11/2017 Arakawa et al.
(Continued)

FOREIGN PATENT DOCUMENTS

DE 102015201766 A1 * 8/2016 ............ B60Q 1/085
JP 2009116723 A 5/2009
(Continued)

OTHER PUBLICATIONS

Machine translated for DE-102015201766-A1 (Year: 2016).*
Machine translated for WO-2017153197-A1 (Year: 2017).*

*Primary Examiner* — Amelia Vorce
*Assistant Examiner* — Misa H Nguyen
(74) *Attorney, Agent, or Firm* — Dickinson Wright, PLLC

(57) ABSTRACT

An apparatus for displaying lane information detects a lane change section in an adjoining lane adjoining a travel lane of a vehicle from an image representing surroundings of the vehicle. The lane change section has a length in a travel direction greater than a lane change threshold indicating a length required for a lane change and includes no other vehicles. The apparatus presents an entry position on a display as a position indicating the lane change section when the entry position is inside the lane change section, and presents an endpoint of the lane change section closest to a current position of the vehicle on the display as a position indicating the lane change section when the entry position is outside the lane change section. The entry position is a position in a front-back direction at which the vehicle making a lane enters the adjoining lane.

4 Claims, 7 Drawing Sheets

(58) Field of Classification Search
CPC ... B60W 2554/4045; B60W 30/18163; B60W 2420/403; B60W 2552/53; B60W 2556/50; B60K 35/22; B60K 35/29; B60K 2360/166; B60K 2360/177; B60K 2360/1868; B60K 35/28; B60K 35/00
See application file for complete search history.

(56) References Cited

U.S. PATENT DOCUMENTS

2018/0157038 A1    6/2018  Kabe
2022/0118983 A1*  4/2022  Yagyu .................. B62D 15/025

FOREIGN PATENT DOCUMENTS

| | | |
|---|---|---|
| JP | 2015075889 A | 4/2015 |
| JP | 2017210034 A | 11/2017 |
| JP | 2018092291 A | 6/2018 |
| JP | 2019137139 A | 8/2019 |
| WO | WO-2017153197 A1 * | 9/2017 ............... B60Q 1/38 |

* cited by examiner

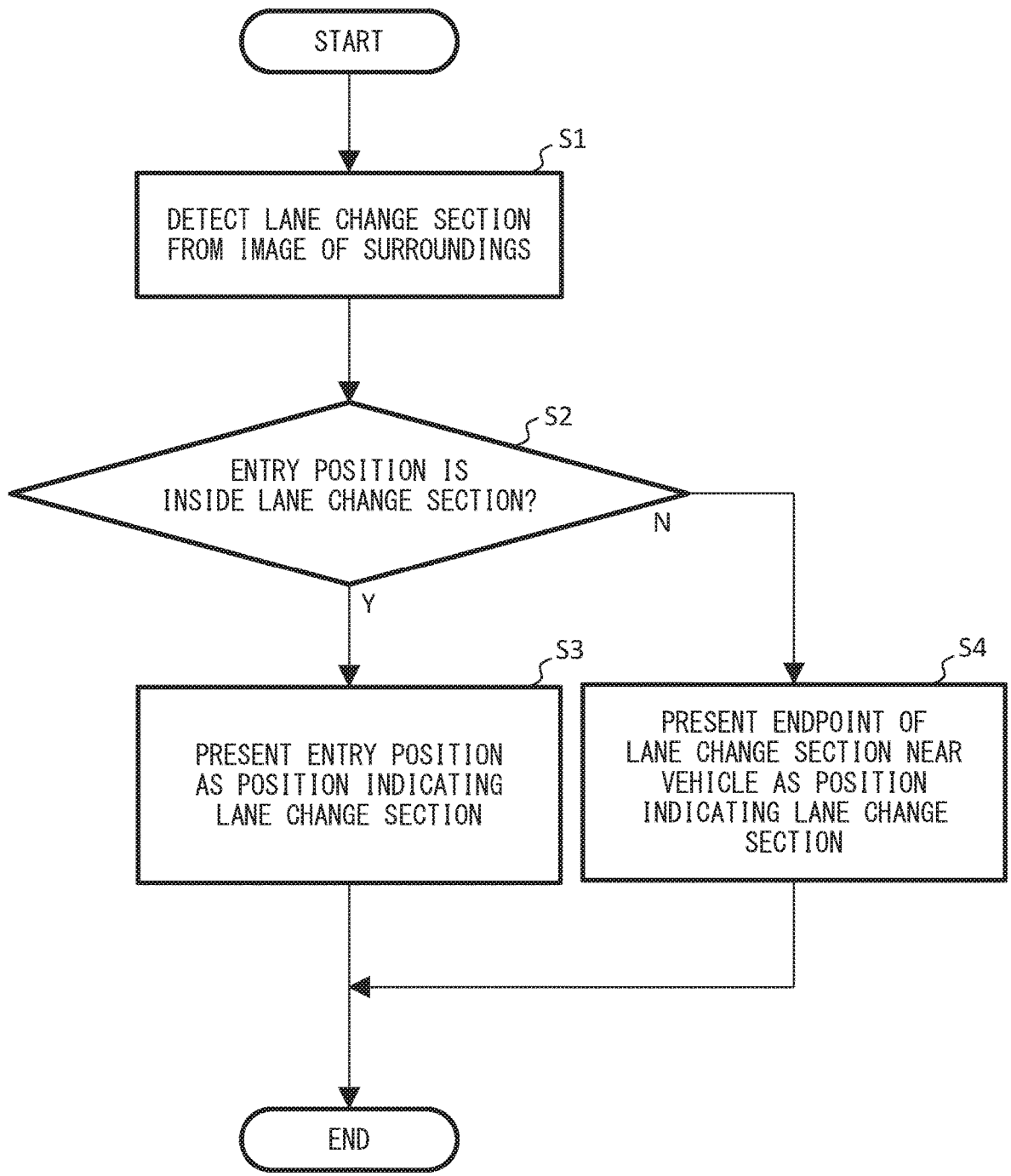

APPARATUS AND METHOD FOR DISPLAYING LANE INFORMATION AND NON-TRANSITORY COMPUTER-READABLE MEDIUM CONTAINING COMPUTER PROGRAM FOR DISPLAYING LANE INFORMATION

FIELD

The present disclosure relates to an apparatus and a method for presenting information on a travel lane of a vehicle on a display and to a non-transitory computer-readable medium containing a computer program therefor.

BACKGROUND

A vehicle whose travel is controlled by a travel controller with information representing the surroundings of the vehicle and outputted by a sensor, such as a camera, mounted on the vehicle provides its driver with information on future travel so that the driver can predict the motion of the vehicle.

Japanese Unexamined Patent Publication No. 2017-210034 describes a travel controller that displays a travel lane and the start point or endpoint of a lane change for guidance at the lane change from the travel lane to another lane.

SUMMARY

A lane change requires a section where no other vehicles are traveling in a destination lane. Since a travel controller cannot control the motion of other vehicles, the motion of a vehicle may cause a plan of a lane change to change. If the start point and endpoint of a lane change are changed together with the plan of the lane change, the start point or endpoint of the lane change presented to the driver by a travel controller may look unnatural to the driver.

It is an object of the present disclosure to provide an apparatus for displaying lane information that presents a section where a lane change is possible on a display in a manner appropriately recognizable by a driver.

An apparatus for displaying lane information according to the present disclosure includes a processor configured to detect a lane change section in an adjoining lane adjoining a travel lane of a vehicle from an image representing surroundings of the vehicle. The lane change section has a length in a travel direction of the vehicle greater than a lane change threshold indicating a length required for a lane change and includes no other vehicles. The processor of the apparatus is further configured to present an entry position on a display as a position indicating the lane change section when the entry position is inside the lane change section. The processor of the apparatus in presenting presents an endpoint of the lane change section closest to a current position of the vehicle on the display as a position indicating the lane change section when the entry position is outside the lane change section. The entry position is a position in a front-back direction at which the vehicle making a lane change from the current position enters the adjoining lane.

The processor of the apparatus according to the present disclosure in presenting preferably presents a figure longer in a width direction than in the travel direction on the display as the position indicating the lane change section.

The processor of the apparatus according to the present disclosure is preferably further configured to finish presentation of the position indicating the lane change section when control of the lane change to the lane change section starts.

A method for displaying lane information according to the present disclosure includes detecting a lane change section in an adjoining lane adjoining a travel lane of a vehicle from an image representing surroundings of the vehicle. The lane change section has a length in a travel direction of the vehicle greater than a lane change threshold indicating a length required for a lane change and includes no other vehicles. The method further includes presenting an entry position on a display as a position indicating the lane change section when the entry position is inside the lane change section, and presenting an endpoint of the lane change section closest to a current position of the vehicle on the display as a position indicating the lane change section when the entry position is outside the lane change section. The entry position is a position in a front-back direction at which the vehicle making a lane change from the current position enters the adjoining lane.

A computer program for displaying lane information stored in a non-transitory computer-readable medium according to the present disclosure causes a processor to execute a process including detecting a lane change section in an adjoining lane adjoining a travel lane of a vehicle from an image representing surroundings of the vehicle. The lane change section has a length in a travel direction of the vehicle greater than a lane change threshold indicating a length required for a lane change and includes no other vehicles. The process further includes presenting an entry position on a display as a position indicating the lane change section when the entry position is inside the lane change section, and presenting an endpoint of the lane change section closest to a current position of the vehicle on the display as a position indicating the lane change section when the entry position is outside the lane change section. The entry position is a position in a front-back direction at which the vehicle making a lane change from the current position enters the adjoining lane.

The apparatus according to the present disclosure can present a section where a lane change is possible on the display in a manner appropriately recognizable by a driver.

BRIEF DESCRIPTION OF DRAWINGS

FIG. 8 is a flowchart of a process for displaying lane information.

DESCRIPTION OF EMBODIMENTS

An apparatus for displaying lane information that can present a section where a lane change is possible on a display in a manner appropriately recognizable by a driver will now be described in detail with reference to the attached drawings. The apparatus detects a lane change section from an image representing surroundings of a vehicle. The lane change section is a section in an adjoining lane adjoining a travel lane of the vehicle, has a length in a travel direction of the vehicle greater than a lane change threshold indicating a length required for a lane change, and includes no other vehicles. The apparatus presents the position of the lane change section on a display. Specifically, when an entry position is inside the lane change section, the apparatus presents the entry position on the display as a position indicating the lane change section. When the entry position is outside the lane change section, the apparatus presents an endpoint of the lane change section closest to a current position of the vehicle on the display as a position indicating the lane change section. The entry position is a position in a front-back direction at which the vehicle making a lane change from the current position enters the adjoining lane.

Figure 1:
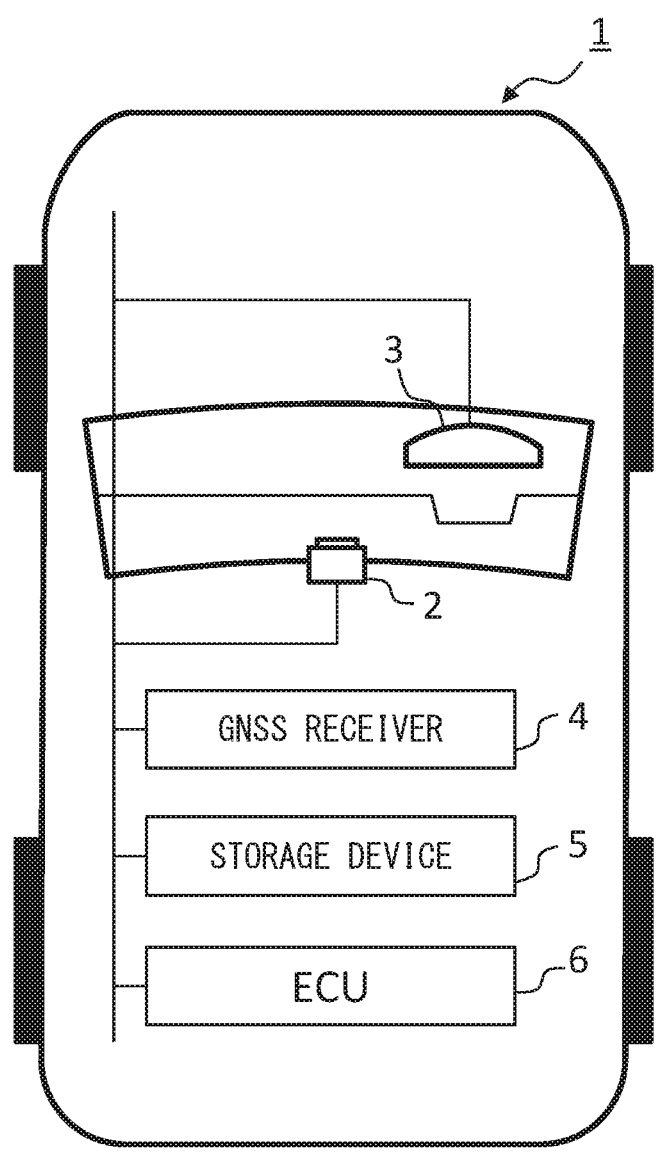
FIG. 1 schematically illustrates the configuration of a vehicle equipped with an apparatus for displaying lane information.

FIG. 1 schematically illustrates the configuration of a vehicle equipped with the apparatus for displaying lane information.

The vehicle 1 includes a camera 2, a meter display 3, a global navigation satellite system (GNSS) receiver 4, a storage device 5, and an electronic control unit (ECU) 6. The ECU 6 is an example of the apparatus for displaying lane information. The camera 2, the meter display 3, the GNSS receiver 4, and the storage device 5 are connected to the ECU 6 via an in-vehicle network conforming to a standard, such as a controller area network, so that they can communicate with each other.

The camera 2 is an example of a sensor for detecting the situation around the vehicle. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs images representing the surroundings.

The meter display 3, which is an example of the display, includes, for example, a liquid crystal display. The meter display 3 presents information on the travel lane of the vehicle 1 so as to be visible to the driver, according to a signal received from the ECU 6 via the in-vehicle network.

The GNSS receiver 4 receives GNSS signals from GNSS satellites at predetermined intervals, and determines the position of the vehicle 1, based on the received GNSS signals. The GNSS receiver 4 outputs positioning signals each indicating the result of determination of the position of the vehicle 1 based on the GNSS signals to the ECU 6 via the in-vehicle network at predetermined intervals.

The storage device 5, which is an example of a storage unit, includes, for example, a hard disk drive or a nonvolatile semiconductor memory. The storage device 5 contains map data including information on features, such as lane lines, in association with their positions.

The ECU 6 generates a trajectory, based on information on features in map data around the position corresponding to a positioning signal outputted by the GNSS receiver 4 and information on features represented in an image of the surroundings generated by the camera 2. The ECU 6 then operates a travel mechanism including an engine or a motor, brakes, and steering so that the vehicle 1 will travel along the trajectory. The ECU 6 presents information on lanes around the trajectory on the meter display 3.

Figure 2:
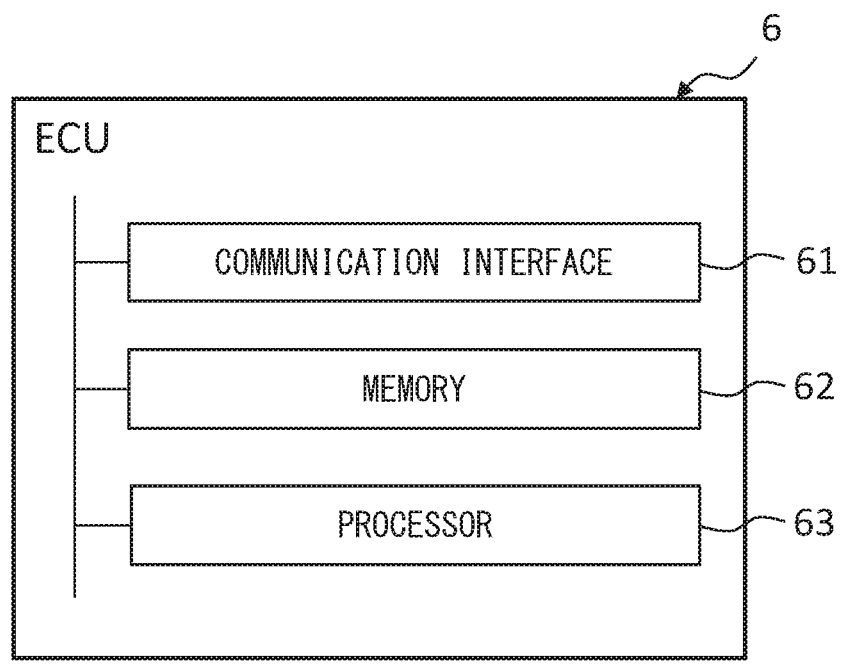
FIG. 2 schematically illustrates the hardware of an ECU.

FIG. 2 schematically illustrates the hardware of the ECU 6. The ECU 6 includes a communication interface 61, a memory 62, and a processor 63.

The communication interface 61, which is an example of a communication unit, includes a communication interface circuit for connecting the ECU 6 to the in-vehicle network. The communication interface 61 provides received data for the processor 63, and outputs data provided from the processor 63 to an external device.

The memory 62 includes volatile and nonvolatile semiconductor memories. The memory 62 contains various types of data used for processing by the processor 63, e.g., a margin length to be kept from a vehicle for determining the length of an interval in a lane including no other vehicles and a lane change threshold for determining whether an interval including no other vehicles is enough for a lane change. The memory 62 also contains various application programs, such as a program for displaying lane information to execute a process therefor.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 3:
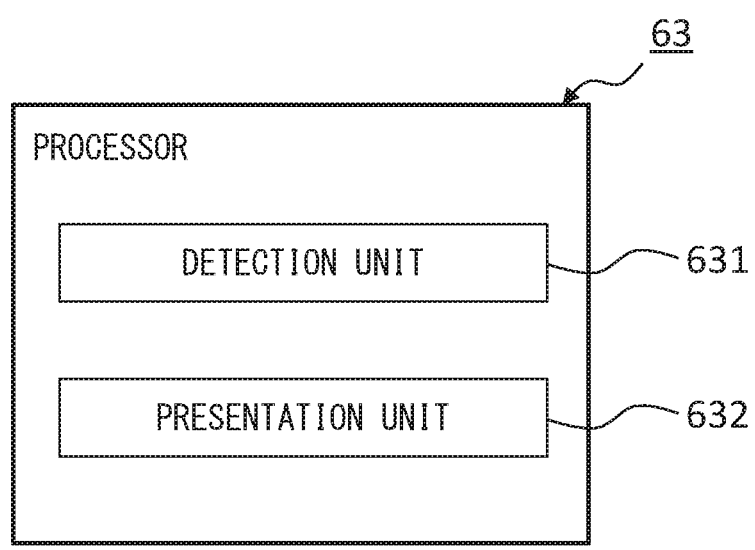
FIG. 3 is a functional block diagram of a processor included in the ECU.

FIG. 3 is a functional block diagram of the processor 63 included in the ECU 6.

As its functional blocks, the processor 63 of the ECU 6 includes a detection unit 631 and a presentation unit 632. These units included in the processor 63 are functional modules implemented by a computer program stored in the memory 62 and executed on the processor 63. The computer program for achieving the functions of the units of the processor 63 may be provided in a form recorded on a computer-readable and portable medium, such as a semiconductor memory, a magnetic recording medium, or an optical recording medium. Alternatively, the units included in the processor 63 may be implemented in the ECU 6 as separate integrated circuits, microprocessors, or firmware.

The detection unit 631 detects a lane change section from an image representing the surroundings of the vehicle.

First, the detection unit 631 inputs an image of the surroundings outputted by the camera 2 into a classifier that has been trained to detect vehicles and lane lines, thereby detecting two or more vehicles and lane lines.

The classifier may be, for example, a convolutional neural network (CNN) including convolution layers connected in series from the input toward the output. A CNN that has been trained using inputted images including vehicles and lane lines as training data operates as a classifier to determine the positions of vehicles and lane lines.

The detection unit 631 then identifies a lane travelable without straddling a lane line as the travel lane of the vehicle 1, using lane lines detected from an image of the surroundings. The detection unit 631 also identifies a lane adjoining the travel lane with a lane line in between as an adjoining line.

The detection unit 631 determines the positions of two or more vehicles detected in the adjoining lane and the length in the travel direction of a section between a pair of lengthwise adjacent vehicles of the two or more vehicles. The detection unit 631 then detects a lane change section having a length in the travel direction greater than the lane change threshold stored in the memory 62.

Figure 4:
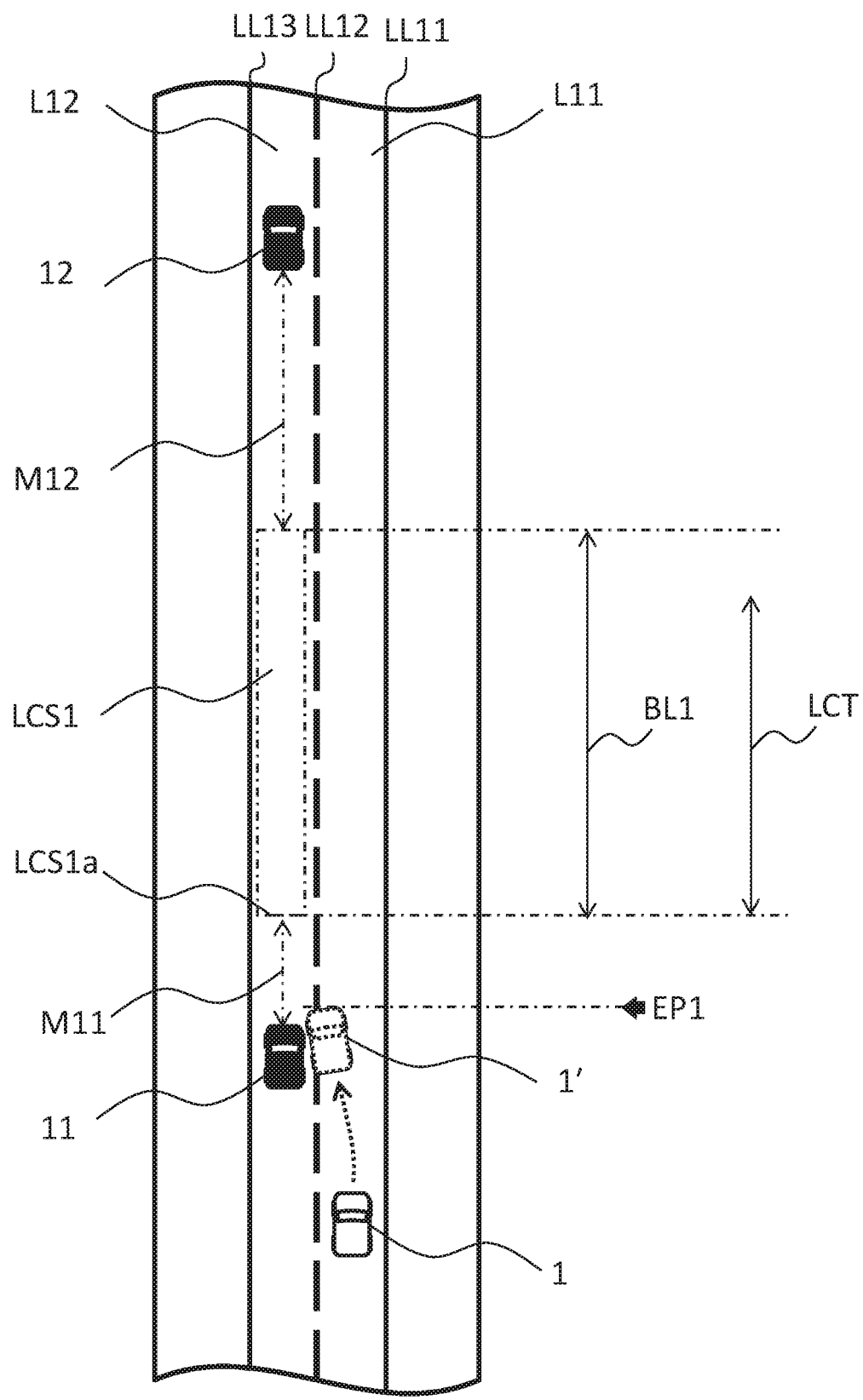
FIG. 4 is a first diagram for explaining a lane change section.

FIG. 4 is a first diagram for explaining the lane change section.

The road being traveled by the vehicle 1 includes lane lines LL11, LL12, and LL13, and the vehicle 1 is traveling on a lane L11 demarcated by the lane lines LL11 and LL12.

The detection unit 631 detects lengthwise adjacent vehicles 11 and 12 in an adjoining lane L12 demarcated by the lane lines LL12 and LL13. The detection unit 631 determines the length BL1 in the travel direction from a position a margin length M11 ahead of the front end of the vehicle 11 to a position a margin length M12 behind the rear end of the vehicle 12. The detection unit 631 then determines whether the length BL1 is greater than the lane change threshold LCT stored in the memory 62, and, if so, detects a lane change section LCS1 corresponding to the length BL1. When changing lanes from the current position, the vehicle 1 enters the adjoining lane L12 at a position 1'. The entry position EP1 is the position of the front end of the vehicle 1 at the position 1'. The detection unit 631 determines the entry position EP1 by referring to an entry position table stored in the memory 62 that associates the current vehicle speed with the distance in the front-back direction from the current position to the entry position. The detection unit 631 may determine the entry position EP1 by generating a trajectory for a lane change from the current position.

The presentation unit 632 presents the position of the lane change section LCS1 on the meter display 3. In the example of FIG. 4, the entry position EP1 is outside the lane change section LCS1. In this case, the presentation unit 632 presents an endpoint LCS1a of the lane change section LCS1 closest to the current position of the vehicle 1 as a position indicating the lane change section LCS1. If the vehicle 12 does not exist in the example of FIG. 4, the lane change section LCS1 does not have a front end in the travel direction. In this case, the rear end LCS1a in the travel direction of the lane change section LCS1 corresponds to the endpoint closest to the current position of the vehicle 1. Thus the presentation unit 632 presents the endpoint LCS1a on the meter display 3 as a position indicating the lane change section LCS1.

Figure 5:
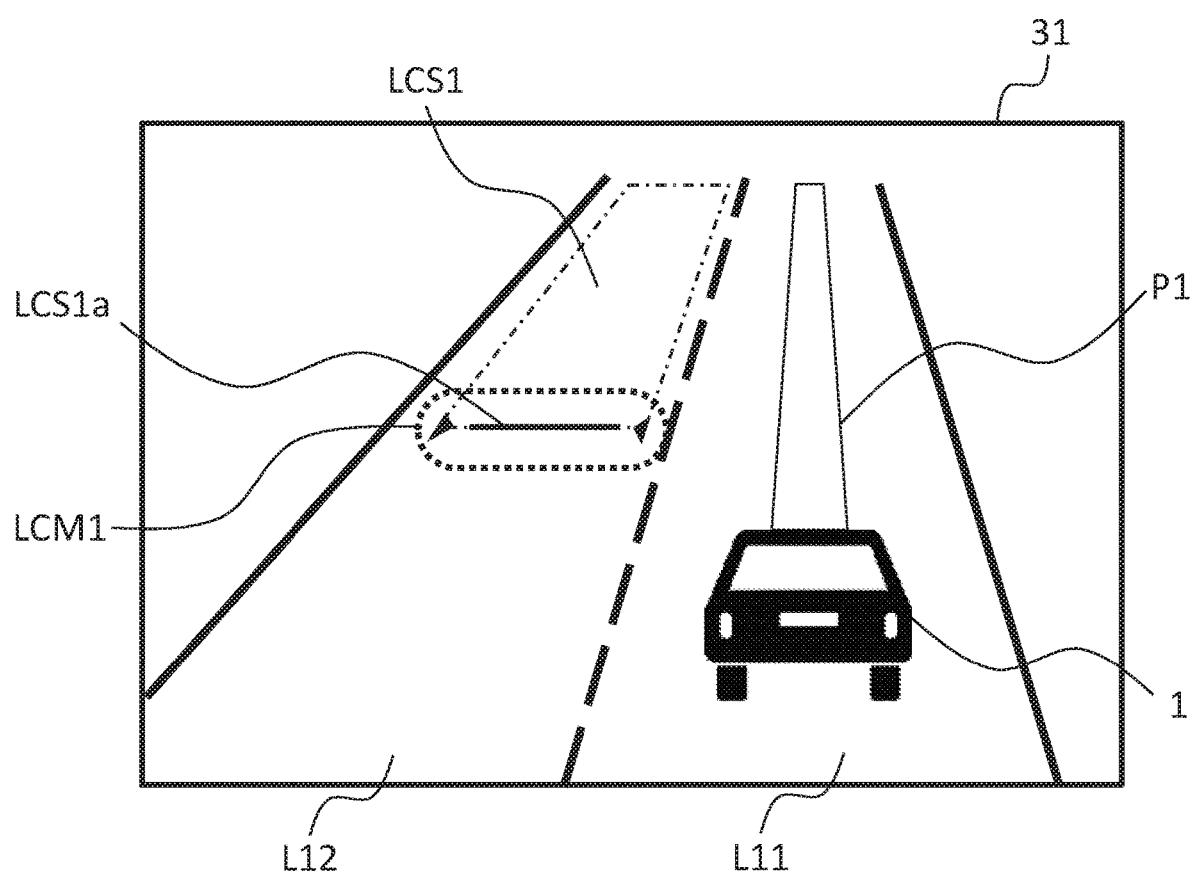
FIG. 5 illustrates a first example of display of lane information.

FIG. 5 illustrates a first example of display of lane information. The presentation unit 632 displays a lane information screen 31 indicating the position of the lane change section LCS1 illustrated in FIG. 4, on the meter display 3.

The lane information screen 31 represents the travel lane L11 and the adjoining lane L12. In the travel lane L11 are represented the vehicle 1 and a trajectory P1 along which the vehicle 1 will be controlled to travel. In the adjoining lane L12 is represented a figure LCM1 indicating the lane change section LCS1. The figure LCM1 indicates the endpoint LCS1a of the lane change section LCS1 closest to the current position of the vehicle 1. The figure LCM1 is longer in the width direction than in the travel direction. In FIG. 5, the figure LCM1 has a line segment in the width direction of the adjoining lane L12 and two triangles separated from the respective ends of the line segment with their vertexes oriented to the center of the line segment. Such presentation of the lane change section LCS1 with a figure longer in the width direction than in the travel direction enables the ECU 6 to make the driver appropriately grasp the position in the front-back direction of the lane change section LCS1.

Figure 6:
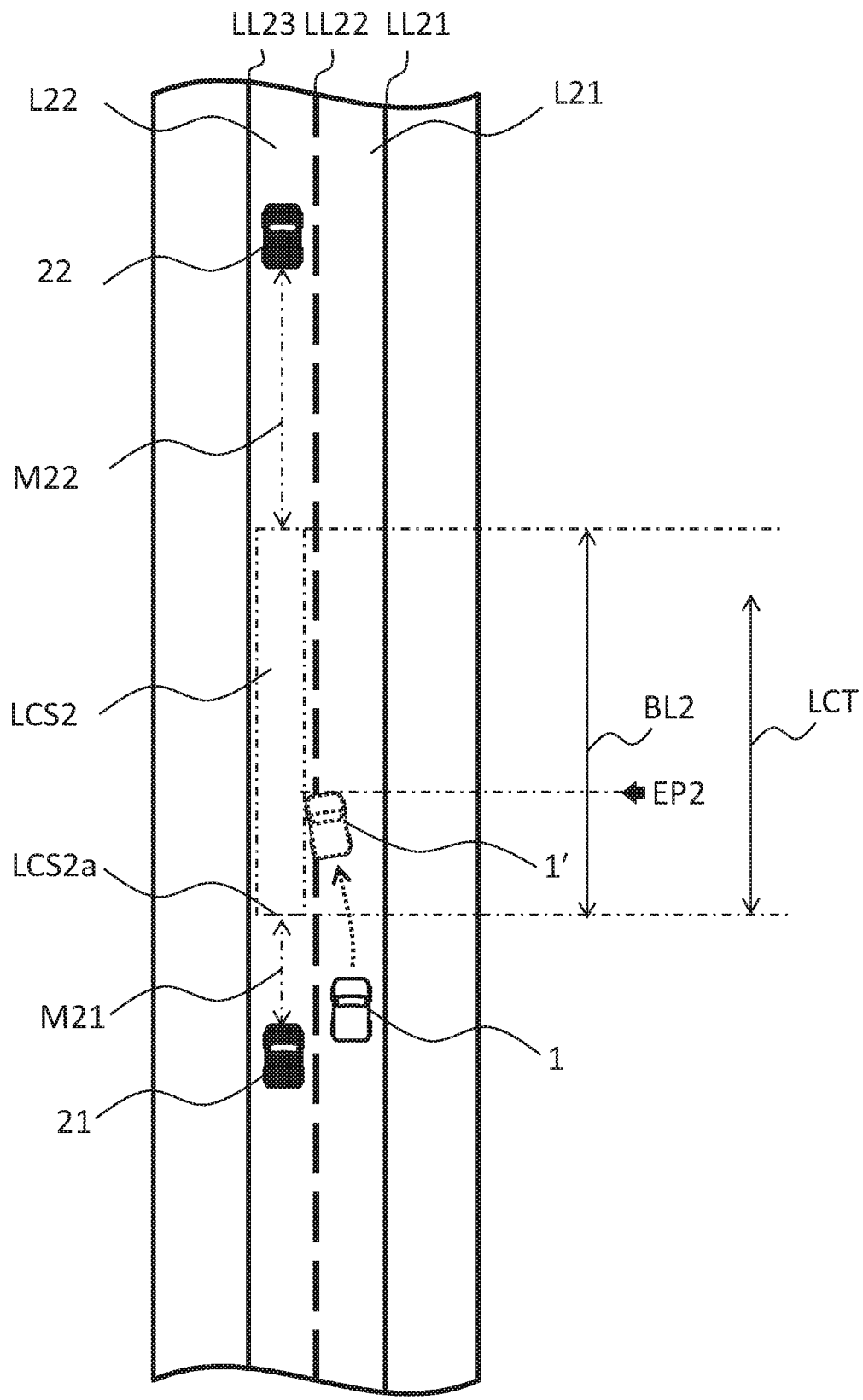
FIG. 6 is a second diagram for explaining a lane change section.

FIG. 6 is a second diagram for explaining the lane change section.

The road being traveled by the vehicle 1 includes lane lines LL21, LL22, and LL23, and the vehicle 1 is traveling on a lane L21 demarcated by the lane lines LL21 and LL22. The detection unit 631 detects a lane change section LCS2 having a length BL2 and located between lengthwise adjacent vehicles 21 and 22 in an adjoining lane L22 demarcated by the lane lines LL22 and LL23.

The entry position EP2 at which the vehicle 1 changes lanes from the current position is inside the lane change section LCS2. In this case, the presentation unit 632 presents the entry position EP2 as the position of the lane change section LCS2.

Figure 7:
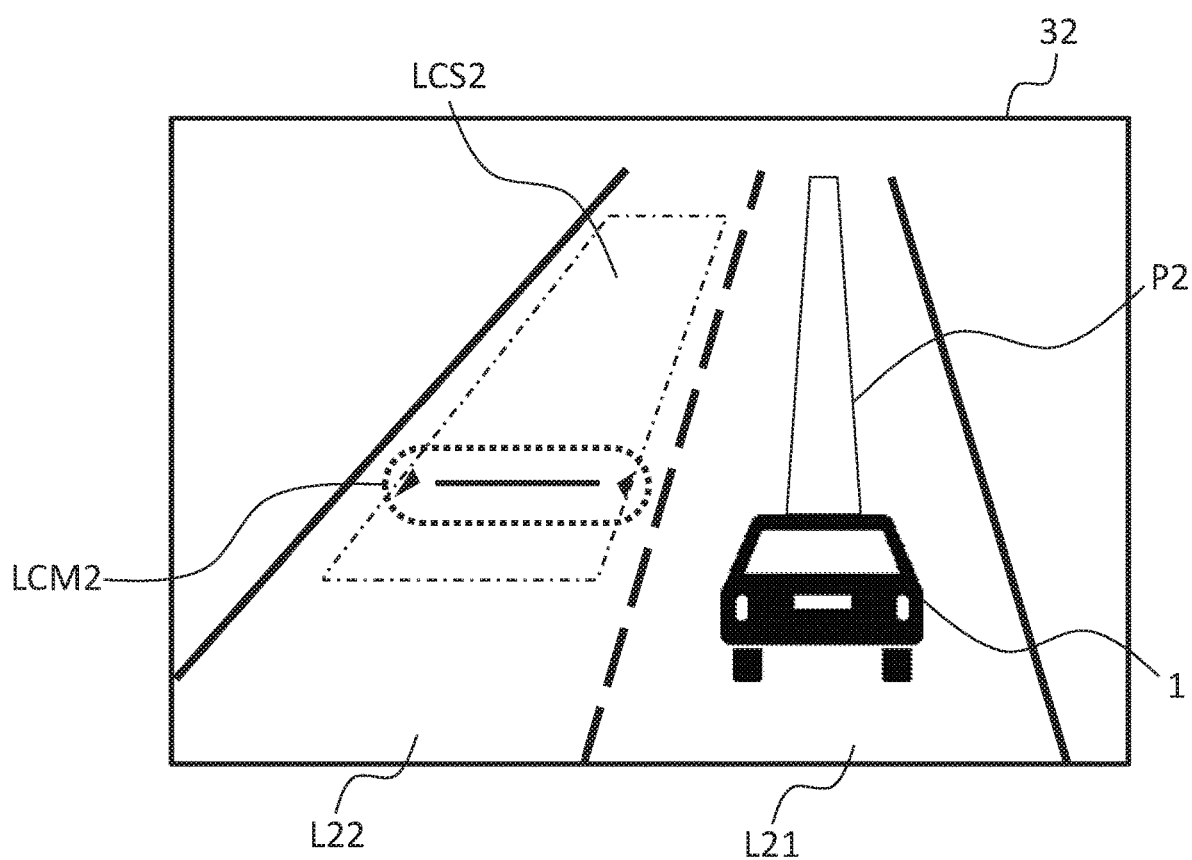
FIG. 7 illustrates a second example of display of lane information.

FIG. 7 illustrates a second example of display of lane information. The presentation unit 632 displays a lane information screen 32 indicating the position of the lane change section LCS2 illustrated in FIG. 6, on the meter display 3.

The lane information screen 32 represents the travel lane L21 and the adjoining lane L22. In the travel lane L21 are represented the vehicle 1 and a trajectory P2 along which the vehicle 1 will be controlled to travel. In the adjoining lane L22 is represented a figure LCM2 indicating the position of the lane change section LCS2. The figure LCM2 indicates the entry position EP2.

When control of the lane change to the lane change section starts, the presentation unit 632 finishes presentation of the position indicating the lane change section. The presentation unit 632 then presents a trajectory for the lane change leading from the travel lane to an adjoining lane under the lane change control, instead of the lane change section, on the meter display 3. The entry position in a trajectory used for lane change control may differ from the actual entry position into an adjoining lane. The ECU 6 finishes presentation of the position indicating the lane change section at the start of lane change control, and thereby prevents presentation of a location that is not used for travel control, so that it will not look unnatural to the driver.

FIG. 8 is a flowchart of a process for displaying lane information. The ECU 6 repeats this process at predetermined intervals (e.g., intervals of 1 second) during travel of the vehicle 1 under autonomous driving control.

First, the detection unit 631 detects a lane change section in an adjoining lane adjoining the travel lane from an image of the surroundings outputted by the camera 2 (step S1). The lane change section has a length in the travel direction of the vehicle 1 greater than the lane change threshold and includes no other vehicles.

The presentation unit 632 determines whether the position in the adjoining lane corresponding to the current position of the vehicle 1 is inside the lane change section (step S2).

When it is determined that the position in the adjoining lane corresponding to the current position of the vehicle 1 is inside the lane change section (Yes in step S2), the presentation unit 632 presents the position in the adjoining lane corresponding to the current position of the vehicle on the meter display 3 as the position of the lane change section (step S3) and terminates the process.

When it is determined that the position in the adjoining lane corresponding to the current position of the vehicle 1 is outside the lane change section (No in step S2), the presentation unit 632 presents an endpoint of the lane change section near the position in the adjoining lane corresponding to the current position of the vehicle 1 on the meter display 3 as the position of the lane change section (step S4) and terminates the process.

Such a process for displaying lane information enables the ECU 6 to present a section where a lane change is possible on a display in a manner appropriately recognizable by the driver.

Note that those skilled in the art can apply various changes, substitutions, and modifications without departing from the spirit and scope of the present disclosure.

What is claimed is:

1. An apparatus for displaying lane information, comprising a processor configured to:
   detect a lane change section in an adjoining lane adjoining a travel lane of a vehicle from an image representing surroundings of the vehicle, wherein the lane change section has a length in a travel direction of the vehicle greater than a lane change threshold indicating a length required for a lane change and includes no other vehicles;
   present an entry position on a display inside the vehicle as a position indicating the lane change section when the entry position is inside the lane change section; and
   present an endpoint of the lane change section closest to a current position of the vehicle on the display as the position indicating the lane change section when the entry position is outside the lane change section, wherein the entry position is a position in a front-back direction at which the vehicle making a lane change from the current position enters the adjoining lane;
   wherein the processor presents a figure longer in a width direction than in the travel direction on the display superimposed on the adjoining lane as the position indicating the lane change section.

2. The apparatus according to claim 1, wherein the processor is further configured to finish presentation of the position indicating the lane change section when control of the lane change to the lane change section starts.

3. A method for displaying lane information, comprising:
   detecting a lane change section in an adjoining lane adjoining a travel lane of a vehicle from an image representing surroundings of the vehicle, wherein the lane change section has a length in a travel direction of the vehicle greater than a lane change threshold indicating a length required for a lane change and includes no other vehicles;
   presenting an entry position on a display inside the vehicle as a position indicating the lane change section when the entry position is inside the lane change section;
   presenting an endpoint of the lane change section closest to a current position of the vehicle on the display as the position indicating the lane change section when the entry position is outside the lane change section, wherein the entry position is a position in a front-back direction at which the vehicle making a lane change from the current position enters the adjoining lane; and
   presenting a figure longer in a width direction than in the travel direction on the display superimposed on the adjoining lane as the position indicating the lane change section.

4. A non-transitory computer-readable medium having a computer program for displaying lane information stored therein, the computer program causing a processor to execute a process comprising:
   detecting a lane change section in an adjoining lane adjoining a travel lane of a vehicle from an image representing surroundings of the vehicle, wherein the lane change section has a length in a travel direction of the vehicle greater than a lane change threshold indicating a length required for a lane change and includes no other vehicles;
   presenting an entry position on a display inside the vehicle as a position indicating the lane change section when the entry position is inside the lane change section:
   presenting an endpoint of the lane change section closest to a current position of the vehicle on the display as the position indicating the lane change section when the entry position is outside the lane change section, wherein the entry position is a position in a front-back direction at which the vehicle making a lane change from the current position enters the adjoining lane; and
   presenting a figure longer in a width direction than in the travel direction on the display superimposed on the adjoining lane as the position indicating the lane change section.

\* \* \* \* \*